United States Patent [19]
Jozwik

[11] Patent Number: 5,644,291
[45] Date of Patent: Jul. 1, 1997

[54] OVERLAPPING STROBE FLASH PATTERN

[75] Inventor: Jacek J. Jozwik, Richton Park, Ill.

[73] Assignee: Federal Signal Corporation, University Park, Ill.

[21] Appl. No.: 493,684

[22] Filed: Jun. 22, 1995

Related U.S. Application Data

[63] Continuation-in-part of Ser. No. 434,237, May 4, 1995, abandoned.

[51] Int. Cl.[6] ................................................. B60Q 1/00
[52] U.S. Cl. ..................... 340/472; 340/331; 340/468; 340/474; 362/74; 362/251
[58] Field of Search ............................ 340/472, 471, 340/659, 478, 331, 332, 932, 908, 908.1, 468, 469, 474; 362/74, 251

[56] References Cited

U.S. PATENT DOCUMENTS

| | | | |
|---|---|---|---|
| 4,189,709 | 2/1980 | Gosswiller | 340/472 |
| 4,595,904 | 6/1986 | Gosswiller et al. | 340/472 |
| 5,097,397 | 3/1992 | Stanuch et al. | 340/472 |
| 5,296,840 | 3/1994 | Gieffers | 340/474 |
| 5,422,623 | 6/1995 | Bader et al. | 340/331 |

OTHER PUBLICATIONS

Product Brochure for SignalMaster™ Directional Light Systems, Federal Signal Corporation, 1994.
Specifications for SignalMaster™ Directional Light Systems, Federal Signal Corporation, May 21, 1993.

*Primary Examiner*—Thomas Mullen
*Assistant Examiner*—Davetta C. Woods
*Attorney, Agent, or Firm*—Leydig, Voit & Mayer, Ltd.

[57] ABSTRACT

A system and method for generating and broadcasting emergency lighting signals wherein the lights are synchronized such that when a first light is energized with a packet of short, rapid bursts, a second light begins to flash before the first light is de-energized. Control circuitry connected to the power source selectively controls the packetized energization of the light sources and includes timing circuitry for periodically energizing a first of the light sources for a first duration and for energizing a second of the light source for a second duration. The second duration overlaps, but is not coincident with the first duration in a repeating pattern such that the first and second sources are periodically energized simultaneously before the first source is de-energized.

19 Claims, 13 Drawing Sheets

| TUBE: | A | B | C | D | DELAY |
|---|---|---|---|---|---|
| | 0 | 1 | 0 | 1 | $T_1$ |
| | 0 | 1 | 0 | 1 | $T_2$ |
| | 0 | 1 | 0 | 0 | $T_3$ |
| | 0 | 1 | 1 | 0 | $T_4$ |
| | 0 | 0 | 1 | 0 | $T_5$ |
| | 1 | 0 | 1 | 0 | $T_6$ |
| | 1 | 0 | 1 | 0 | $T_7$ |
| | 1 | 0 | 0 | 0 | $T_8$ |
| | 1 | 0 | 0 | 1 | $T_9$ |
| | 0 | 0 | 0 | 1 | $T_{10}$ |

FIG. 8A

| TUBE: | L | A | B | C | D | R | DELAY |
|---|---|---|---|---|---|---|---|
| | 1 | 0 | 1 | 0 | 1 | 0 | $T_1$ |
| | 1 | 0 | 1 | 0 | 1 | 0 | $T_2$ |
| | 1 | 0 | 1 | 0 | 0 | 0 | $T_3$ |
| | 1 | 0 | 1 | 1 | 0 | 0 | $T_4$ |
| | 0 | 0 | 0 | 1 | 0 | 0 | $T_5$ |
| | 0 | 1 | 0 | 1 | 0 | 1 | $T_6$ |
| | 0 | 1 | 0 | 1 | 0 | 1 | $T_7$ |
| | 0 | 1 | 0 | 0 | 0 | 1 | $T_8$ |
| | 0 | 1 | 0 | 0 | 1 | 1 | $T_9$ |
| | 0 | 0 | 0 | 0 | 1 | 0 | $T_{10}$ |

FIG. 8B

| TUBE: | A | B | C | D | DELAY |
|---|---|---|---|---|---|
| | 1 | 0 | 0 | 1 | $T_1$ |
| | 1 | 0 | 0 | 1 | $T_2$ |
| | 1 | 0 | 1 | 0 | $T_3$ |
| | 1 | 0 | 1 | 0 | $T_4$ |
| | 0 | 1 | 1 | 0 | $T_5$ |
| | 0 | 1 | 1 | 0 | $T_6$ |
| | 0 | 1 | 0 | 1 | $T_7$ |
| | 0 | 1 | 0 | 1 | $T_8$ |

FIG. 8C

| TUBE: | A | B | C | D | DELAY |
|---|---|---|---|---|---|
| | 1 | 0 | 0 | 1 | $T_1$ |
| | 1 | 0 | 0 | 1 | $T_2$ |
| | 1 | 1 | 0 | 0 | $T_3$ |
| | 1 | 1 | 0 | 0 | $T_4$ |
| | 0 | 1 | 1 | 0 | $T_5$ |
| | 0 | 1 | 1 | 0 | $T_6$ |
| | 0 | 0 | 1 | 1 | $T_7$ |
| | 0 | 0 | 1 | 1 | $T_8$ |

FIG. 8D

| TUBE: | A | B | C | D | DELAY |
|---|---|---|---|---|---|
| | 1 | 1 | 0 | 0 | $T_1$ |
| | 1 | 1 | 0 | 0 | $T_2$ |
| | 1 | 0 | 1 | 0 | $T_3$ |
| | 1 | 0 | 1 | 0 | $T_4$ |
| | 0 | 0 | 1 | 1 | $T_5$ |
| | 0 | 0 | 1 | 1 | $T_6$ |
| | 0 | 1 | 0 | 1 | $T_7$ |
| | 0 | 1 | 0 | 1 | $T_8$ |

FIG. 8E

OVERLAPPING STROBE FLASH PATTERN

The present application is a continuation-in-part of the U.S. patent application Ser. No. 08/434,237 entitled "Overlapping Strobe Flash Pattern" by Jacek J. Jozwik, filed on May 4, 1995, now abandoned.

FIELD OF THE INVENTION

The present invention relates generally to emergency lighting systems, and more particularly to an improved method and system for flashing lights for emergency signalling.

BACKGROUND OF THE INVENTION

Many emergency vehicles, including ambulances, police vehicles, and emergency fire apparatus vehicles, output visible warning signals through the use of flashing lights. The primary object of the flashing lights is to call attention to the vehicle in order to warn observers of an emergency situation. Consequently, the effectiveness of the warning system depends on how well the flashing lights are observed.

At the same time, lights attached to emergency vehicles are typically required to flash at a rate of between 60 and 240 flashes per minute (one to four hertz) as standardized by the Society of Automotive Engineers (SAE J-845, SAE J-595, SAE J-1318). Thus, any attempt to enhance the effectiveness of warning lights ordinarily must comply with these standards.

Strobe lights, or strobe tubes, which provide a very bright flash of light, are often employed for emergency signalling. However, strobe lights provide a relatively short flash of light, and thus have an undesirably long interval between flashes when flashed at the standardized flash rates.

One manner of enhancing the effectiveness of a strobe light-based emergency signalling system involves periodically energizing the strobe light with a packet of short, rapid driving pulses (i.e., "pulse packet") followed by a time duration wherein the light is not flashed. During the time that the strobe light is driven by the pulse packet, i.e., the "on" time, the light appears to an observer to be essentially continuous due to the persistence of the retina. The off time, when the packet is not sent, is provided so that the strobe and associated driving circuitry can recharge, and also so that the strobe light appears to be flashing at the standardized rate. Observers perceive the flash as light having an apparently longer duration and/or a greater intensity than similar strobe lights flashed by a single pulse with driving signals of comparable amplitudes.

Another attempt to improve signalling effectiveness involves increasing the frequency of the flash rate. However, increasing the frequency of the flash rate causes a decrease in the perceived light output intensity due to a reduction in the dwell time in the human eye. Consequently, as the flash rate increases, an increase in the intensity is needed to keep the perceived intensity constant. Nevertheless, as the flash rate increases, the ability to increase the intensity decreases as a result of a corresponding reduction in available recharging time of the strobe and driving circuitry. Thus an inherent tradeoff is present in the combined amount of visible activity. Alternatively, the brightness may be increased, but this comparably requires that the flash rate remain the same or be reduced.

Another method of enhancing signalling effectiveness involves alternating the flashes between two or more strobe lights, which may be filtered to produce lights of differing colors. With a single power supply, the strobes are driven such that one bulb or one set of bulbs is energized while the others are not. Multiple power supplies have been employed for indicating certain types of emergency situations, but they have not been synchronized in any particular manner.

In each of these above-described situations, there is no way to prevent a time interval between the energization bursts wherein none of the light sources are being energized. To a human observer, this time interval constitutes a "dark time" wherein no visible information is being broadcast from the vehicle, thereby lessening the potential effectiveness of the warning system.

OBJECTS AND SUMMARY OF THE INVENTION

Accordingly, it is an object of the present invention to improve the effectiveness of an emergency lighting system.

In accomplishing that object, another object is to provide a lighting system and method that reduces or substantially eliminates the amount of dark time between strobe flashes.

It is a related object to provide such a lighting system that enables the strobe to be flashed at increased flash rates without a corresponding reduction in light intensity.

It is another related object to provide a lighting system and method of the above kind that provides the light at increased intensities while enabling increased flash rates.

It is another object to provide a method and system as characterized above that is relatively simple to implement with existing types of emergency light sources, including strobe lights.

Briefly, the invention provides a system and method for generating and broadcasting emergency lighting signals wherein light sources are synchronized such that each time a first light source is illuminated in a flash pattern, such as with a burst of short, rapid drive signals, a second light source begins to be illuminated before the first light source ceases to be illuminated. The system includes a plurality of light sources wherein each of the light sources broadcasts a light beam. A control circuit connected to a modulator modulates each of the light sources between at least first and second states of brightness, where the first state is brighter than the second state. The controller includes means for synchronizing the output states of the light beams in a periodic illumination pattern so that the light beam of at least one of the light sources is modulated to the first state of brightness before the light beam of another light source is modulated from the first state of brightness to the second state of brightness.

Other objects and advantages will become apparent from the following detailed description when taken in conjunction with the attached drawings, in which:

While the invention is amenable to various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention as expressed in the appended claims.

DETAILED DESCRIPTION OF THE PREFERRED EMBODIMENT

Figure 1:
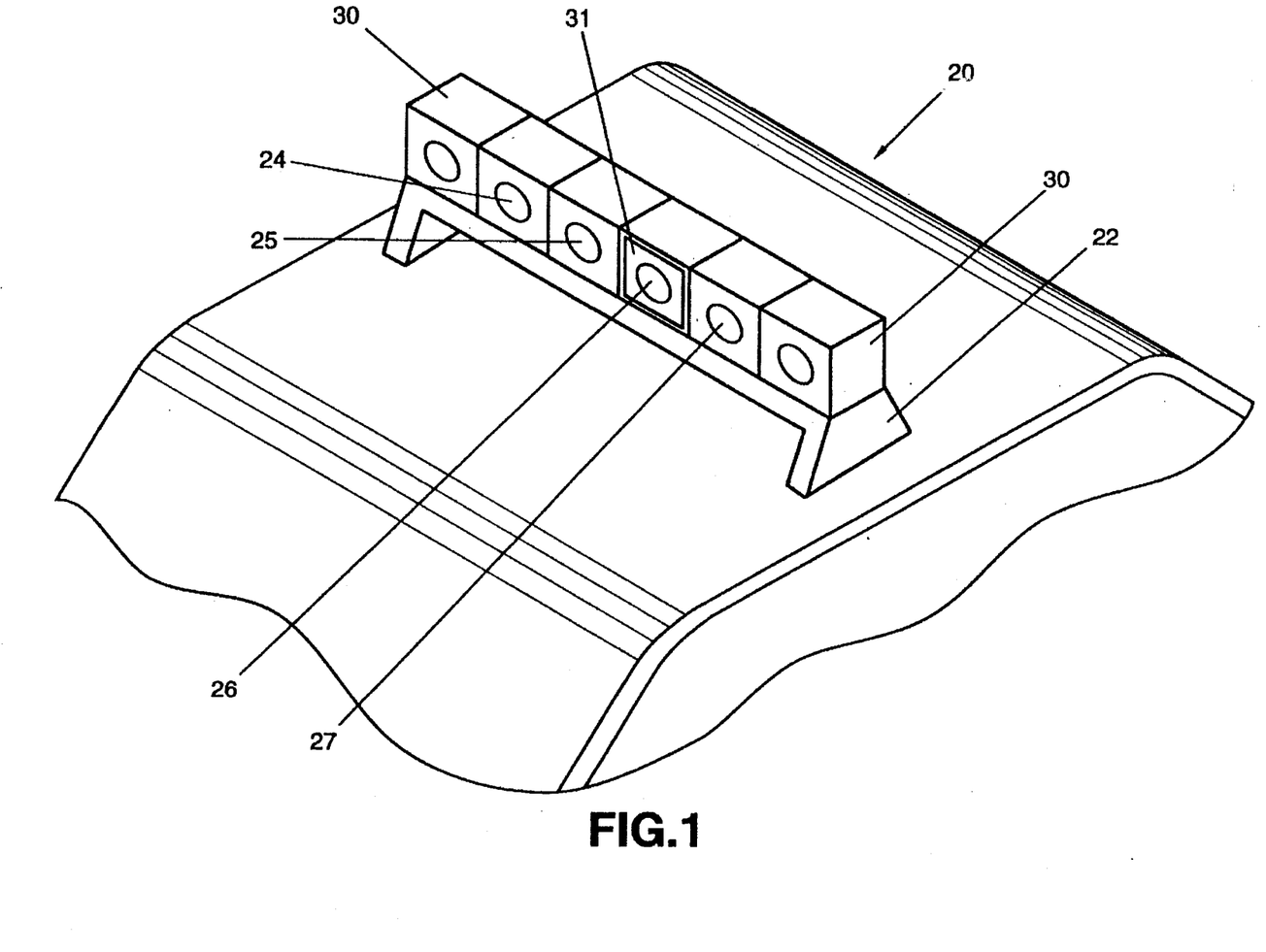
FIG. 1 is a perspective view illustrating an emergency lighting device mounted to a vehicle according to one embodiment of the present invention.

Turning now to the drawings and referring first to FIG. 1, there is shown an emergency signalling device generally designated 20 including a base 22 and incorporated mounting apparatus for mounting to a surface of a motor vehicle, ordinarily the motor vehicle's roof. A plurality of light sources 24–27, preferably conventional strobe tubes capable of being driven by packets of short, rapid energization bursts, are mounted to the base 22. The base 22 supports a light housing 30 which is dimensioned to enclose and protect the light sources 24–27, the light housing 30 being transmissive to at least one frequency of light generated by the light sources 24–27 in at least one direction. One or more filters 31 may be provided to produce lighting signals of desired colors.

Although the exemplified signalling device 20 is illustrated as a plurality of light sources 24–27 within a light bar, it can readily be appreciated that virtually any base, housing and light source design will suffice for the purposes of the present invention. Moreover, the signalling device need not be coupled to a vehicle, but instead may be fixed at an appropriate installation, and comprise any number of light sources. Finally, the base 22 may be arranged to mount one or more speakers (not shown) to the vehicle. One light system into which the present invention may by suitably incorporated is the Jetstrobe-Plus™ emergency lighting system, commercially manufactured by Federal Signal Corporation, University Park, Ill., the assignee of the present invention.

In accordance with one aspect of the invention, the light sources 24–27 are selectively modulated in a pattern that substantially reduces or eliminates the dark time between flashes, as described in more detail below. To modulate the light sources 24–27 with such a pattern, a logic circuit 32 (FIG. 2), which may be a circuit 36 comprising dedicated digital integrated circuits (FIGS. 3 and 4A–4D) or a microprocessor-based circuit 34 (FIG. 5), selectively provides the appropriate logic level signals. As can be appreciated, the signals from the logic circuit 32 may be selectively activated by a switch (not shown) associated with a user interface 33 located inside the vehicle.

Figure 2:
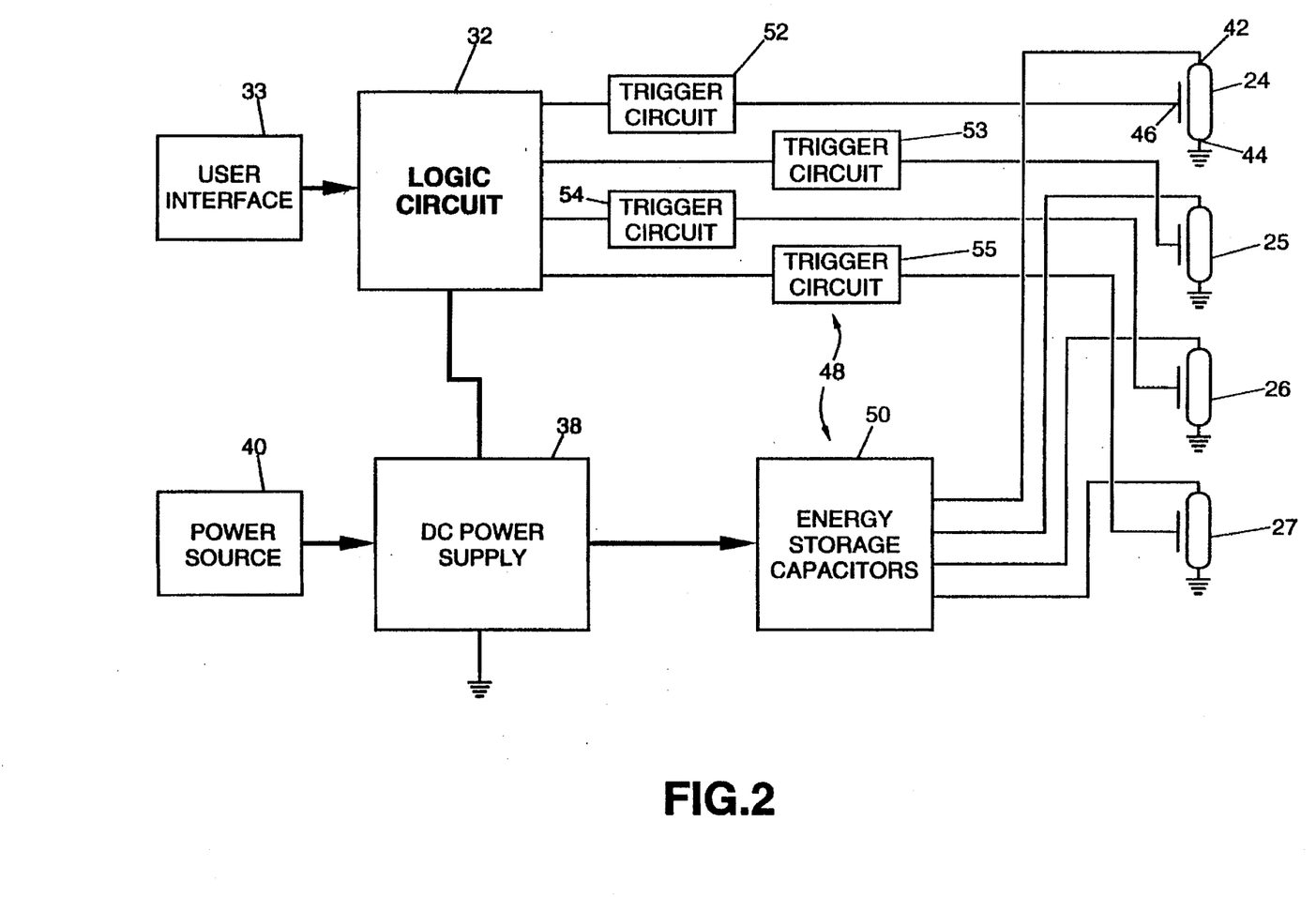
FIG. 2 is a general block diagram illustrating the connections for driving the light sources with logic level signals.

In a preferred embodiment, the light sources 24–27 are modulated by selective energization and de-energization thereof. To selectively energize and de-energize the light sources 24–27 in accordance with the logic level signals, a suitable modulator means comprising driving circuit 48 is provided. The driving circuit 48 is connected in a known manner to the light sources 24–27, which are preferably strobe tubes having anodes 42, grounded cathodes 44 and trigger electrodes 46 to trigger the light flashes. The driving circuit 48 thus typically includes energy storage capacitors 50 coupled to the anodes 42 of the strobe tubes 24–27 as shown in FIG. 2, along with individual trigger circuits 52–55. The individual trigger circuits 52–55 are separately connected to the trigger electrodes of the strobe tubes 24–27 in a conventional manner, and each commonly include a silicon controlled rectifier, a capacitor, a charging resistor and a trigger transformer.

Although it is feasible to modulate the light sources 24–27 with simple on-off pulses to produce the patterns according to the invention at the desired flash rates, it is preferable to flash the strobe tubes with a packet of short, rapid pulses. As described above, the light flashes produced by such short, rapid pulses appear to an observer to be essentially continuous, thereby lengthening the apparent duration or "on" time of the strobe tube. Accordingly, as used herein the term "packet" is intended to mean one or more pulses that, when utilized to drive a suitable light source, illuminate the light source in a manner that appears to ordinary observers to be continuous.

To power the light sources and optionally the logic circuit 32, a DC power supply 38 is provided and may comprise a separate switching power supply coupled to a power source 40 such as an automotive battery. Alternatively, the DC power supply 38 may comprise a voltage regulator or the like in combination with a battery. In any event, the power supply 38 is connected to charge the energy storage capacitors 50.

Turning to an explanation of the operation of the invention with particular reference to the timing diagrams of FIGS. 7A–7E, when activated, the logic circuit 32 provides packets of pulses which control the modulation of the light sources 24–27 via the driving circuit 48. For purposes of illustration, the packets are shown as dotted lines surrounding the pulses in FIGS. 7A–7B, and as high and low lines in FIGS. 7C–7E wherein the individual pulses are not shown.

Figure 7A:
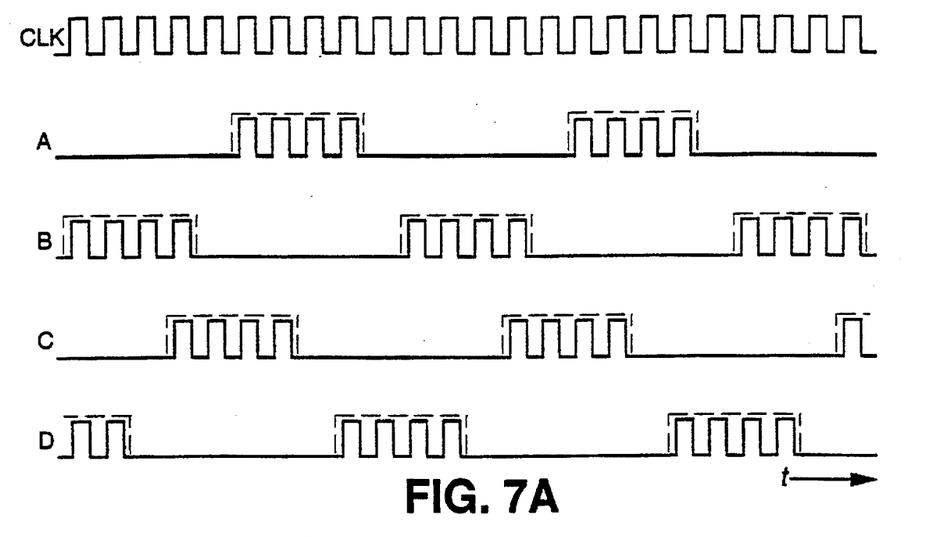
FIGS. 7A–7E are timing diagrams illustrating multiple flash patterns according to the invention.
Figure 7B:
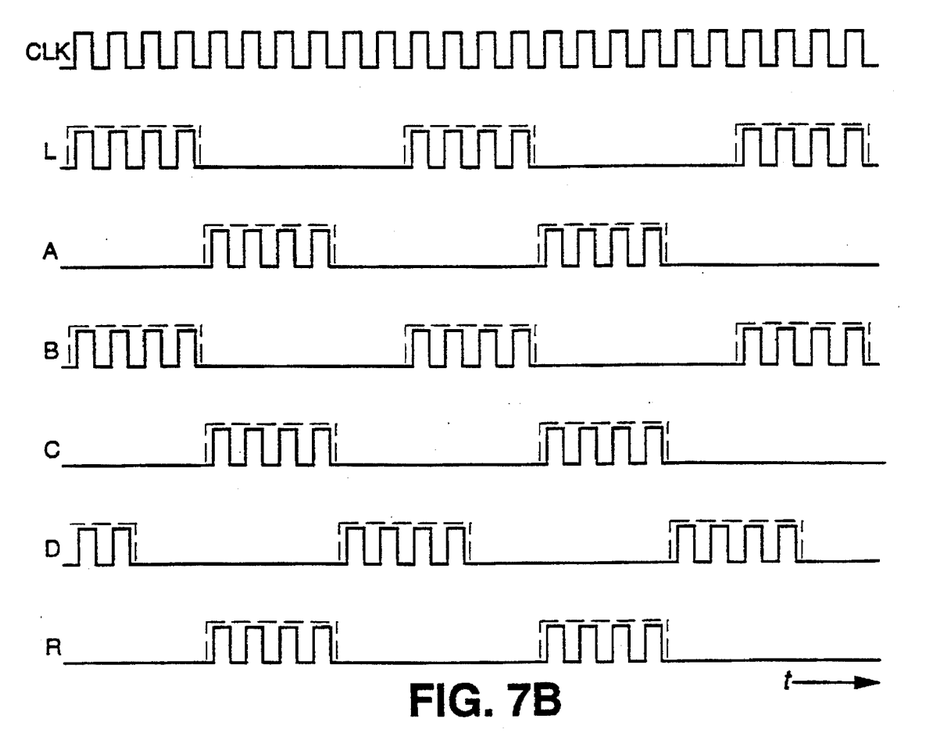
Figure 7C:
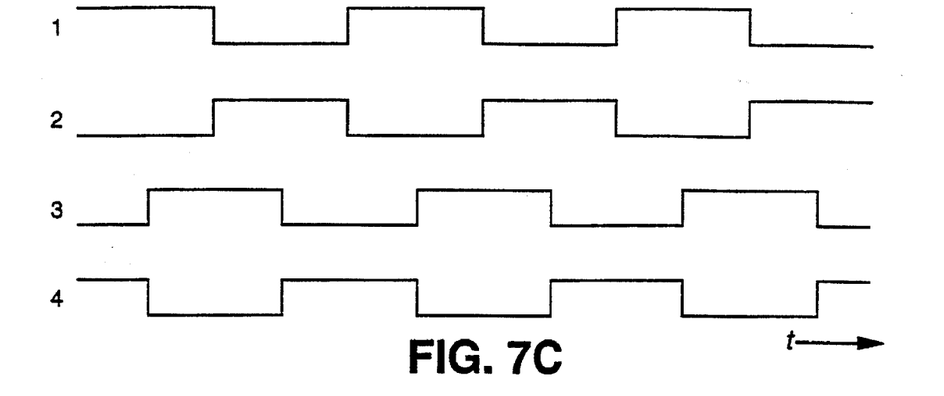
Figure 7D:
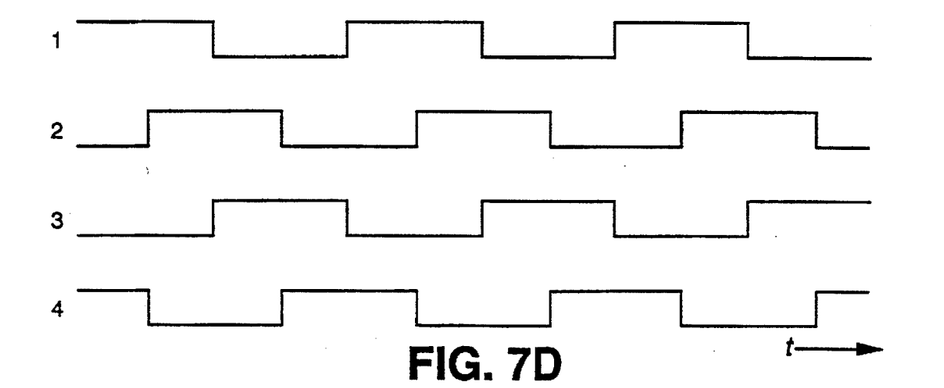
Figure 7E:
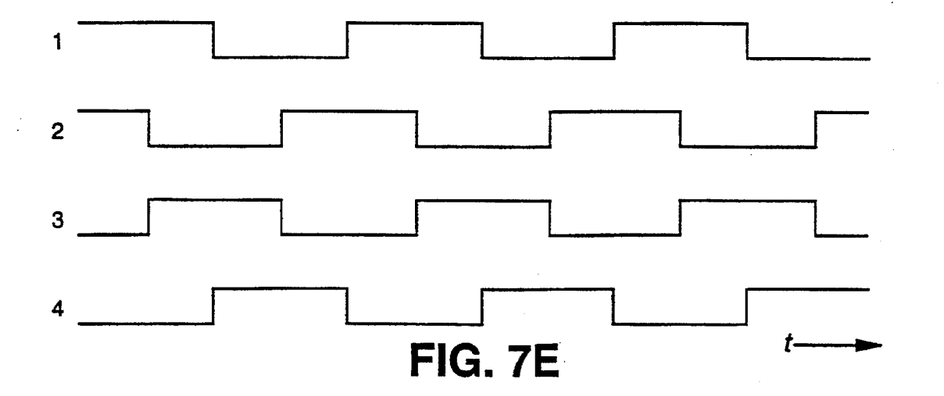

According to one aspect of the present invention, and as exemplified in each of the timing diagrams of FIGS. 7A–7E, at least one of the packets is applied to one of the light sources 24–27 throughout the signalling process, the signalling process being a continuous duration of time in which the signalling device is activated to generate an emergency signal. As described in more detail below, the logic circuit 32 generates the packets to each light source 24–27 such that at least one other packet begins to drive a light source (e.g., 24) while at least one of the other packets is still being applied to at least one other source (e.g. 25, 26 and/or 27). FIGS. 7A and 7C–7E show suitable overlapping patterns for the light sources 24–27 of FIG. 2, while FIG. 7B shows one overlapping pattern for a system of six light sources.

By way of contrast, FIGS. 6A–6E show various conventional ways of driving a signalling system. As can be appreciated, in the prior art method it regularly occurs that none of the lights are perceived by an observer as being turned on. During these dark times, no visible information is being broadcast from the vehicle.

With the present invention, at any given time during emergency signalling, at least one of the light sources is modulated to a first state of brightness, from a second state of brightness, where the first state is brighter than the second state. This may be accomplished by varying the candela and/or color of the light beam thereby affecting its perceived brightness. By way of example, if the modulation comprises selectively applying driving packets to energize the light sources, at any given time during emergency signalling at least one of the light sources will be energized (i.e., modulated to a first state of brightness) via a driving packet.

When the modulation comprises intensity variation of the light sources 24–27, such as by complete energization and de-energization thereof as in the above example, distinctive color filtering is preferably utilized in order to prevent more-distant observers from perceiving the light as coming from a continuous, rather than flashing, source. However, this is not necessary to the invention, as the spatial separation between the numerous light sources provides a visual effect that provides observers with the ability to distinguish between the individual sources, thereby maintaining a flashing characteristic. Moreover, the light sources 24–27 may be further distinguished by having certain ones illuminate at a reduced intensity with respect to others. Finally, at certain times only one of the sources may be illuminated, while at other times multiple sources can be illuminated, providing a perceived intensity variation.

Of course, numerous patterns of overlapping two or more light systems are feasible, and there is no intent to limit the invention to the patterns shown with the exemplified four or six light systems of FIGS. 7A–7E. Furthermore, the system and method of the present invention are not limited to strobe lights, but instead contemplates numerous types of light sources including filament-type light sources and high intensity discharge devices such as xenon-metal halide lamps. Moreover, there is no reason that the flashing light must be completely energized and de-energized to provide the flashing signals, as periodic modulations in the perceived brightness of the light sources, such as changes to the output intensity and/or output color, may be utilized to produce the desired flashing effect. Such alternative methods of emergency signalling are described in U.S. patent application Ser. No. 08/382,647, hereby incorporated in its entirety by reference.

Moreover, the system that enables the present invention is capable of being operated in the conventional manner merely by making a simple adjustment to the logic signals. For example, as can be appreciated the microprocessor-based circuit needs only to output a pattern of different values to produce conventional, non-overlapping signals. In the digital logic circuit, a simple switch setting, such as via the user interface 33, converts the overlapping pattern of the present invention to a conventional pattern using the same basic circuitry.

Figure 5:
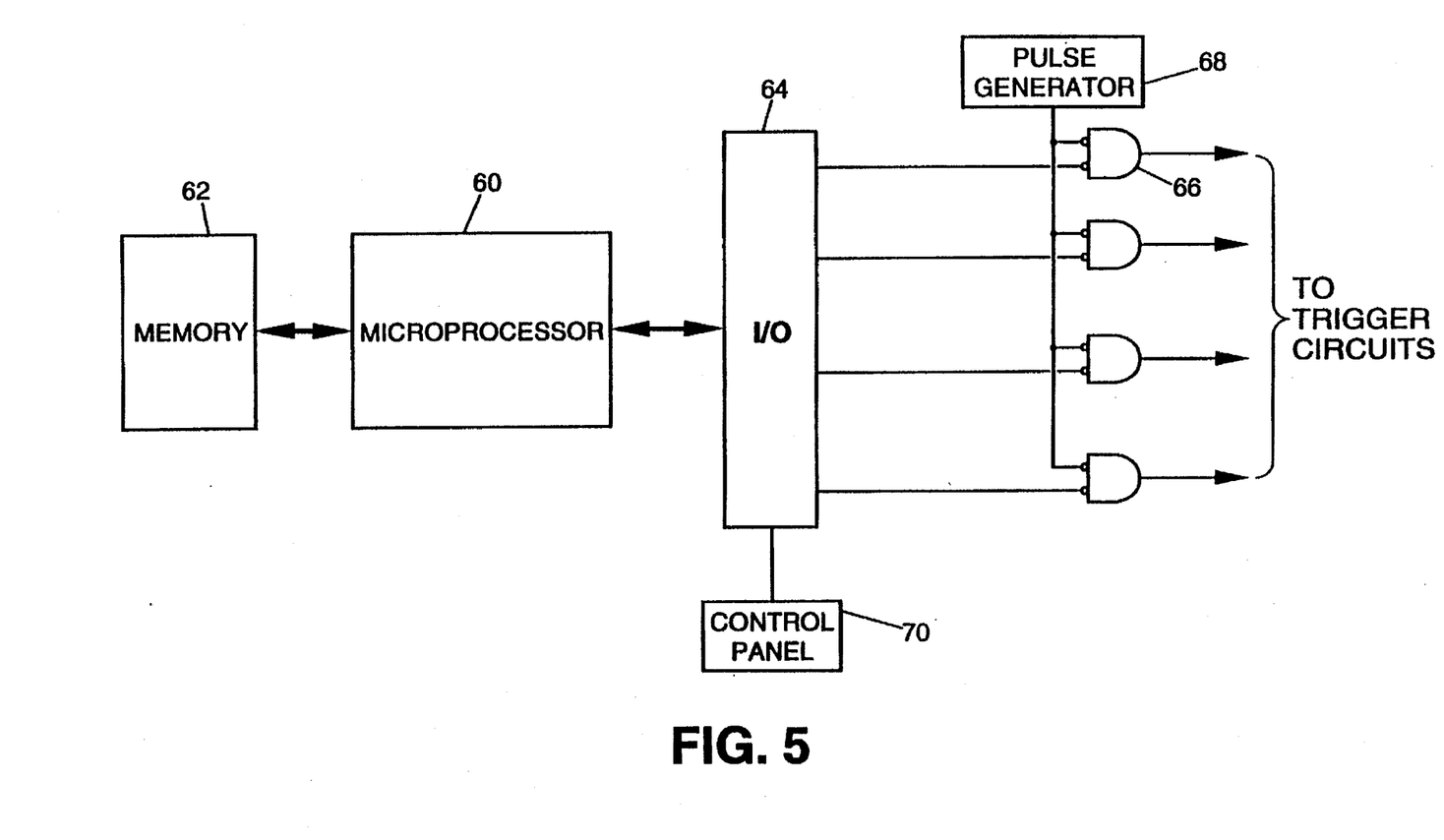
FIG. 5 is a schematic of a circuit employing a microprocessor for providing logic signals to accomplish the invention.
Figure 6A:
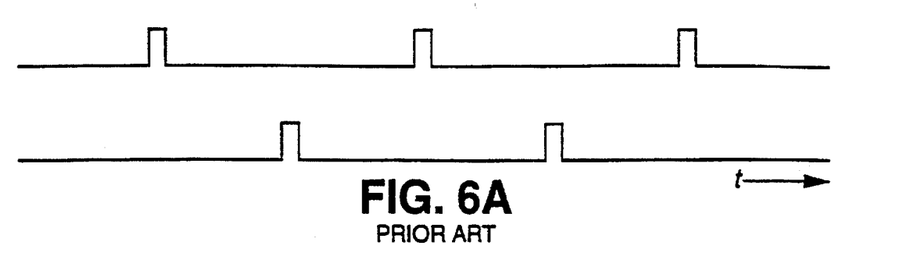
FIGS. 6A–6E are timing diagrams illustrating multiple flash patterns of the prior art.
Figure 6B:
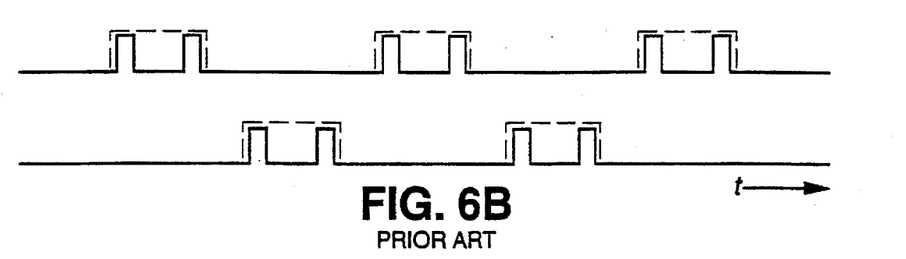
Figure 6C:
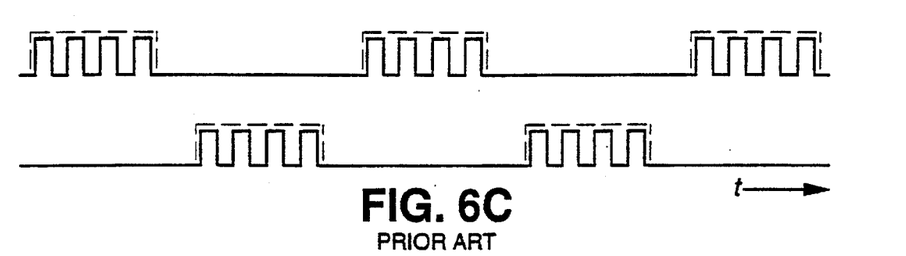
Figure 6D:
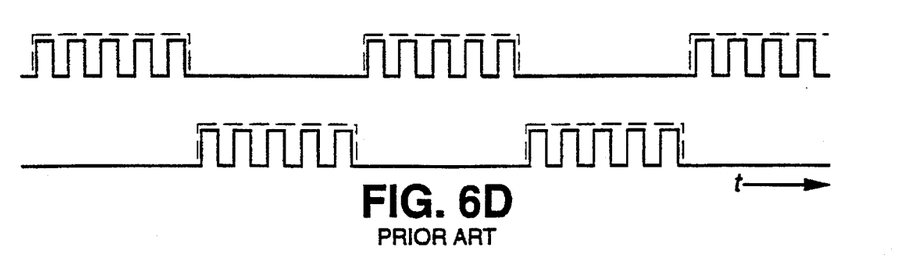
Figure 6E:
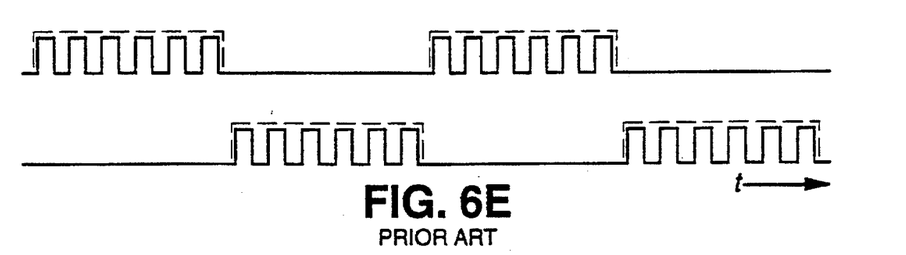

To trigger the flashes according to the invention, in a first embodiment shown in FIG. 5 a microprocessor 60 is employed to provide the appropriately timed output signals to actuate the trigger circuits. The microprocessor 60 is connected to a memory 62 wherein data representing the signalling patterns is stored in a look-up table. The microprocessor 60 then accesses the table repeatedly to output the values after a suitable delay, thus flashing the strobes at an appropriate frequency.

By way of example, FIGS. 8A–8E represent maps of the memory 62 for providing the logic signals that produce the timing diagrams of FIGS. 7A–7E, respectively. To this end, the microprocessor 60 is connected through I/O circuitry 64 such as a buffer and/or latch to logic gates 66. A pulse generator 68 provides clock pulses such as those shown in FIGS. 7A and 7B to the gates 66. As can be appreciated, the microprocessor 60 thus controls the application of the clock pulses to the trigger circuits 52–55 (FIG. 2) by outputting ones and zeroes to the logic gates 66.

The user interface 33 may comprise a control panel 70 connected to the microprocessor 60, having switches or the like thereon for notifying the microprocessor 60 which of several various operating modes are desired. The control panel 70 may also contain a switch requesting that the microprocessor 60 completely turn off the flashing in non-emergency situations.

By way of example, the control panel 70 may instruct the microprocessor 60 to flash the lights in a pattern corresponding to that of the timing diagrams of FIG. 7A. In the example, timing diagrams A–D of FIG. 7A correspond to light sources 24–27, respectively. As can be appreciated, the flashing is accomplished as the microprocessor 60 generates the output signals indicated by the dotted lines of FIG. 7A. As described previously, the pulses under these signals comprise and/or correspond to the packets of pulses that will ultimately drive the light sources 24–27.

Figure 8A:
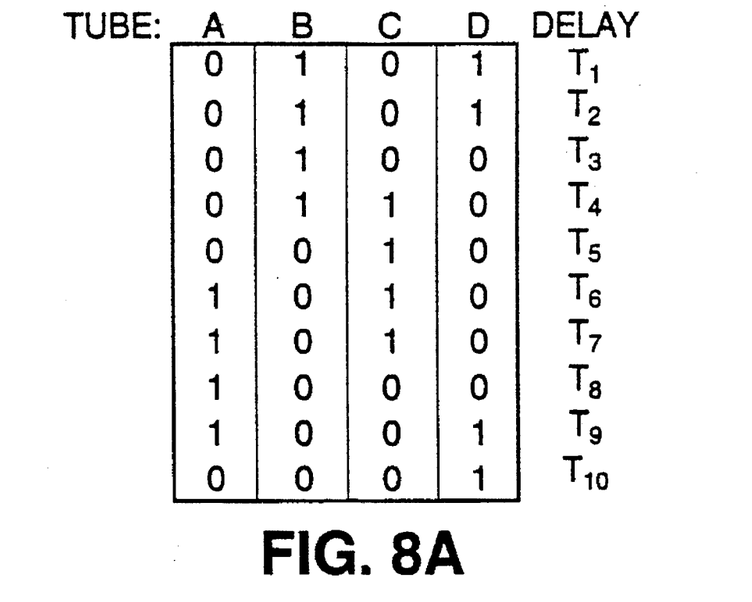
FIGS. 8A–8E comprise memory maps for providing the outputs of FIGS. 7A–7E, respectively, when accessed by the microprocessor of FIG. 5.
Figure 8B:
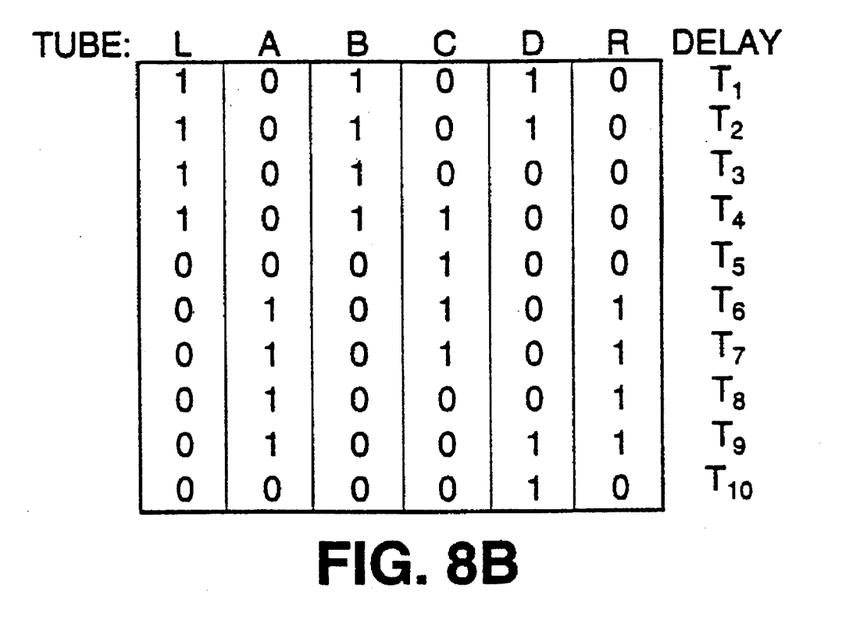
Figure 8C:
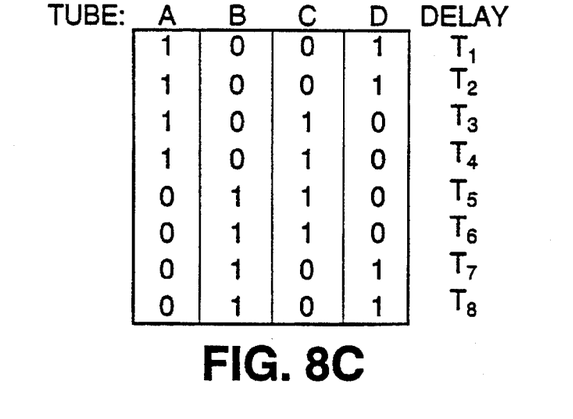
Figure 8D:
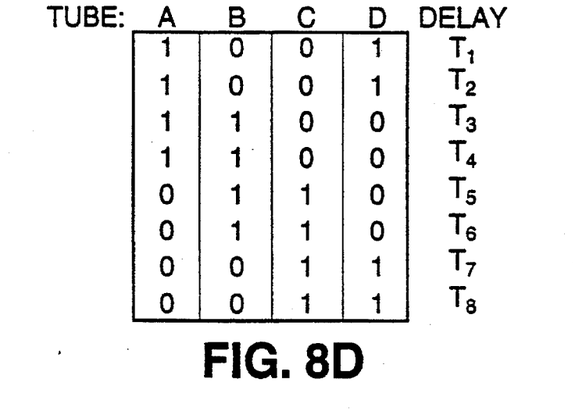
Figure 8E:
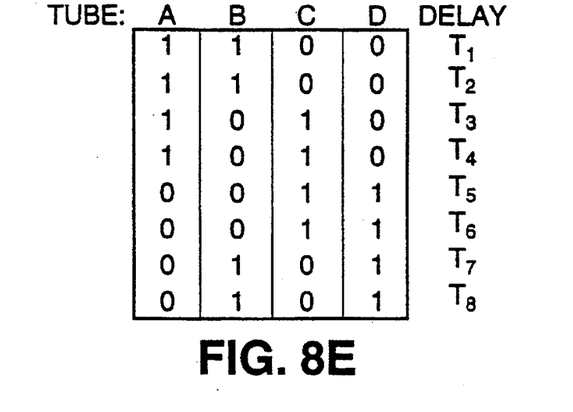

To generate the appropriate highs and lows that form the packets, the microprocessor 60 accesses the memory table 72 of FIG. 8A. For a first and second period of time, $T_1$ and $T_2$, the microprocessor 60 outputs a 0101 binary, followed by a 0101 binary. After the time period $T_2$, the microprocessor 60 outputs a 0100 binary for a time of $T_3$, and so on. After $T_{10}$, (0001 binary) the memory pointer is moved back to the first 0101 entry. Each time $T_n$ is a full clock cycle of the clock signal in FIGS. 7A and 7B.

FIGS. 8B–8E show alternative memory tables that correspond to the timing diagrams of FIG. 7B–7E, respectively. Accordingly, numerous patterns, both overlapping and conventional non-overlapping patterns, may be implemented utilizing the same circuitry.

It will be appreciated that the functions of the pulse generator 68 and the gates 66 may be performed by the microprocessor 60 and, therefore, separate timing and gate hardware as illustrated is not necessary. For example, by halving the delay times for each output of the above-mentioned binary values, (e.g., to correspond to a first half of a clock cycle), and by outputting all zeroes between each of those values for the remaining half of the delay, (e.g., the second half of the cycle), appropriate pulses having a fifty percent duty cycle will be directly generated by the microprocessor 60. Moreover, with this method the appropriate flash rate and other duty cycles may be generated simply by varying the delay times, as no external pulse generator needs to be present. The phrase "delay time" means the appropriate amount of time necessary to generate pulses of a desired duration. A delay time is necessary because the microprocessor 60 would otherwise loop faster than the desired pulse duration.

Figure 3:
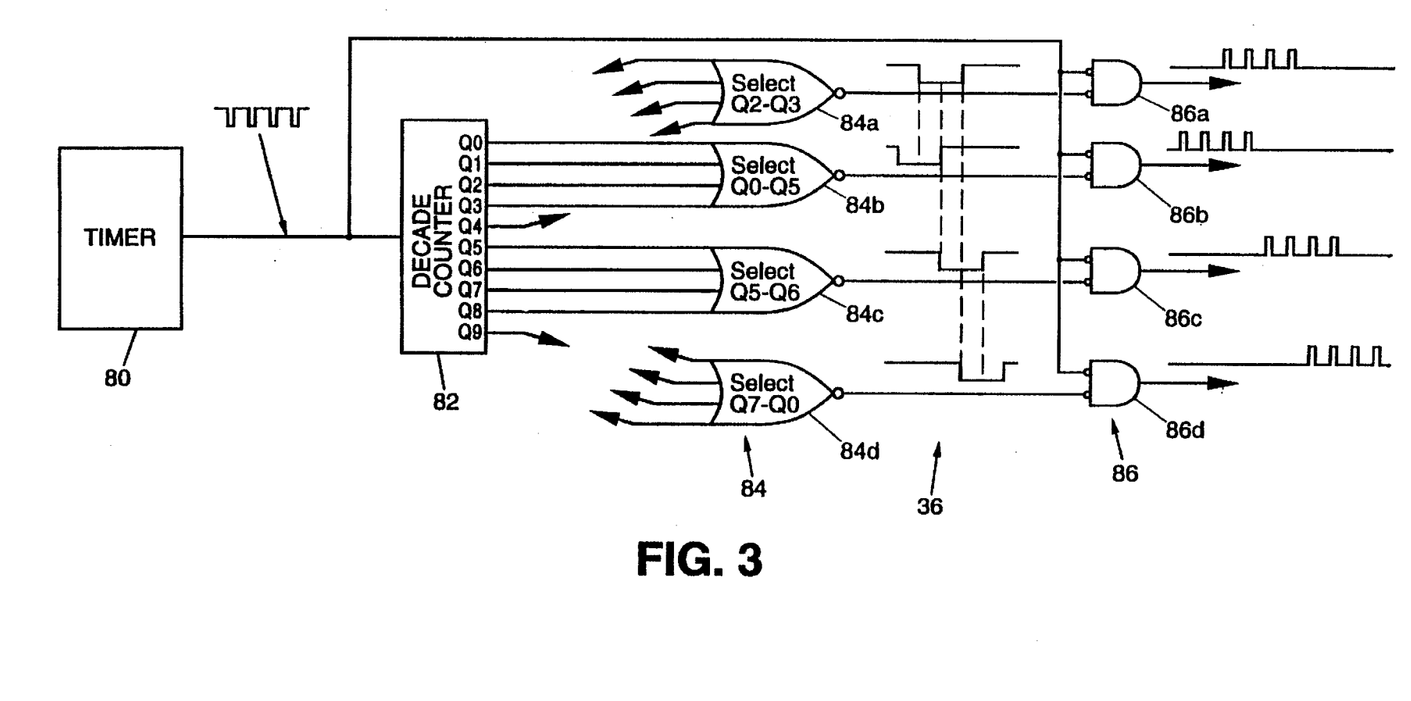
FIG. 3 is a simplified block diagram of an electronic circuit for providing the logic signals to trigger the light sources according to the invention.
Figure 4A:
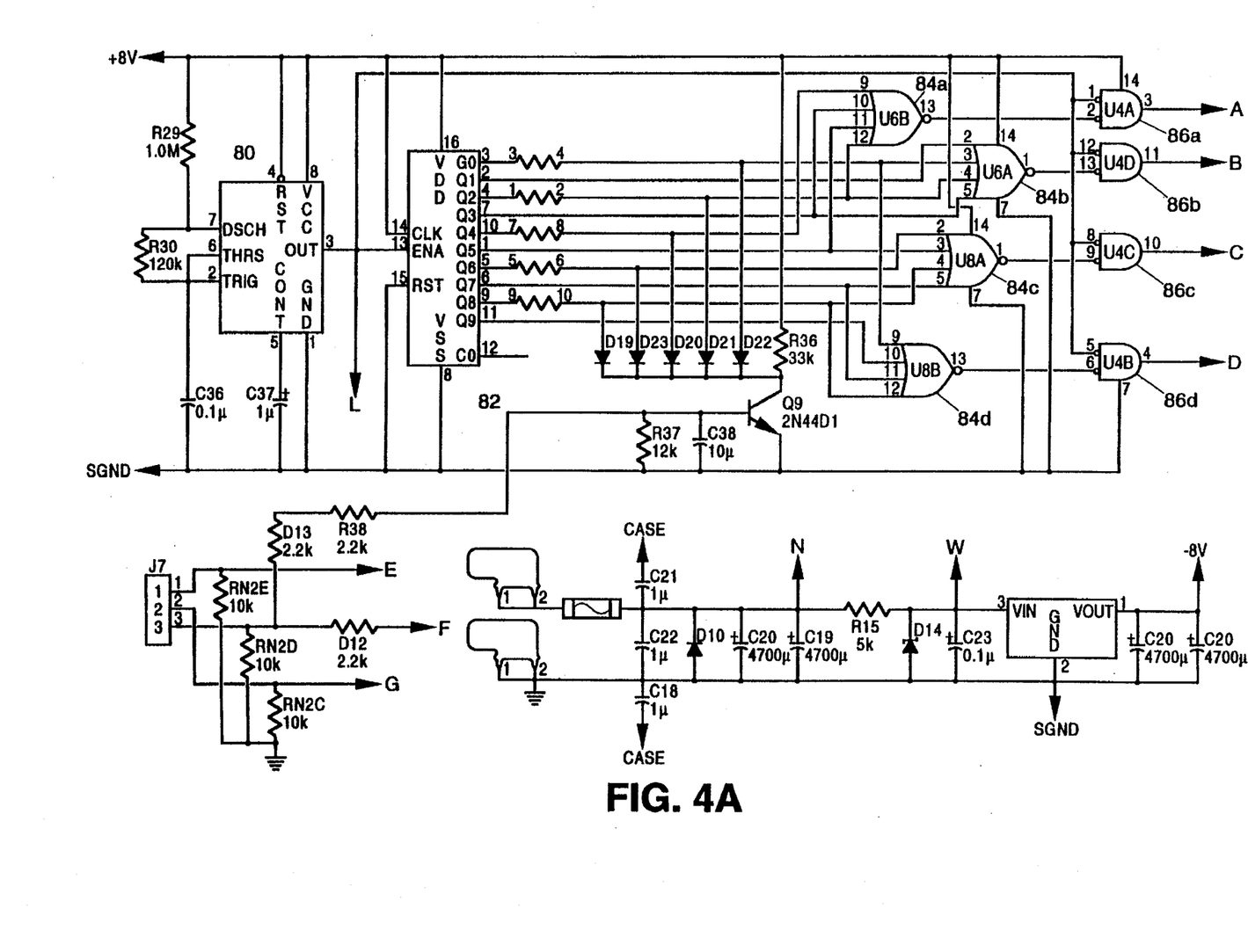
FIGS. 4A–4D comprise a more detailed schematic diagram of an electronic circuit using digital logic circuits for providing logic signals to accomplish the invention.
Figure 4B:
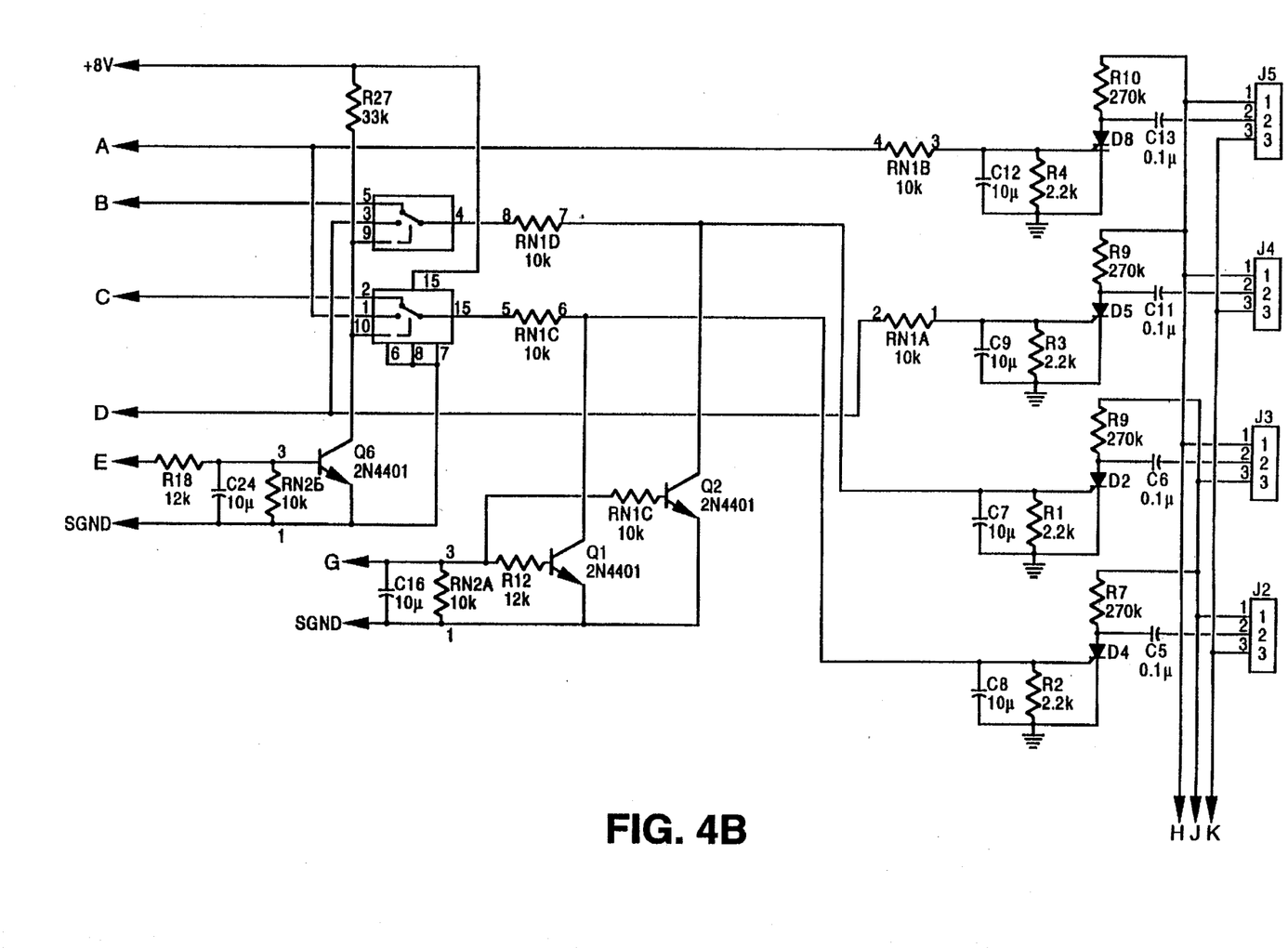
Figure 4C:
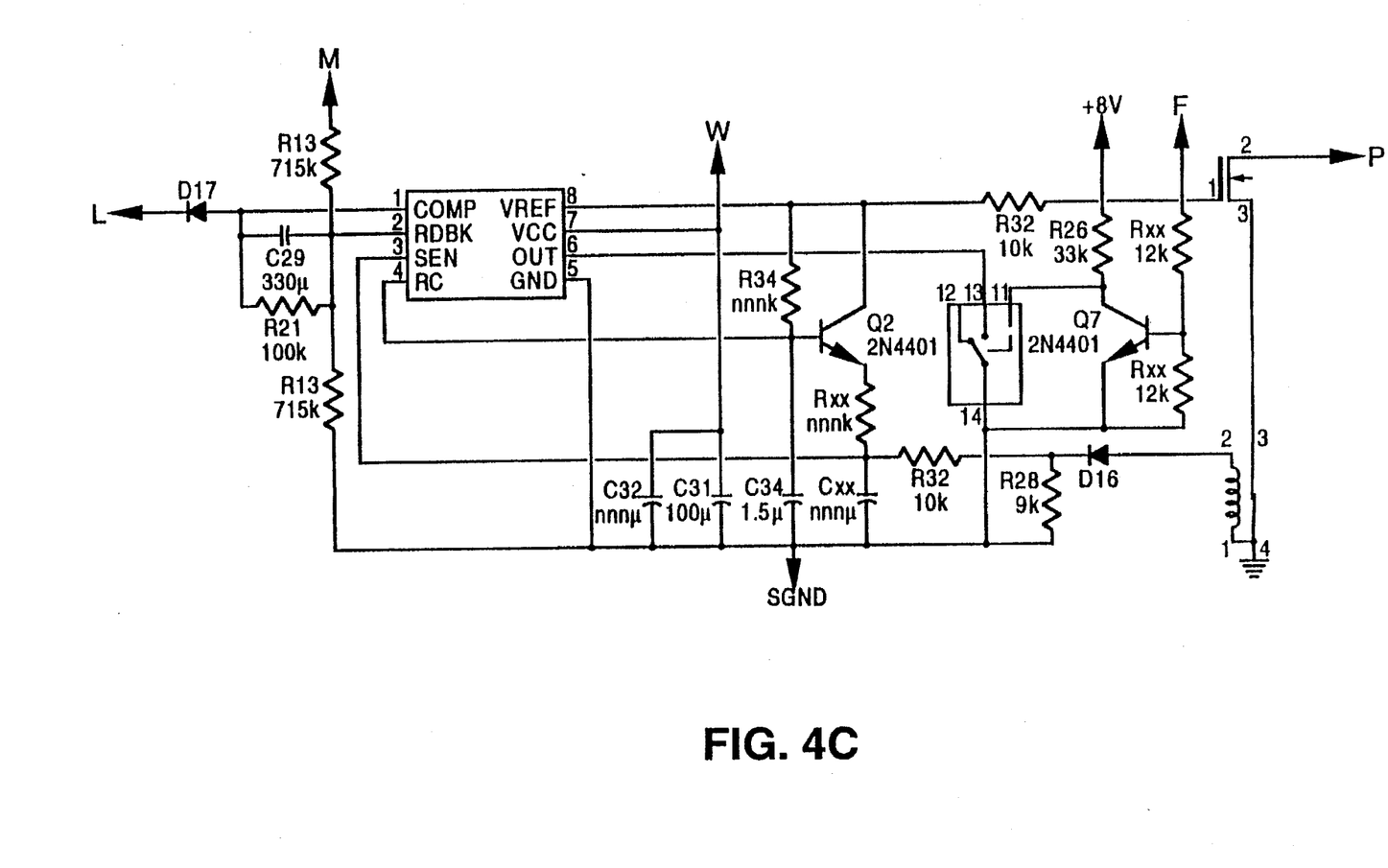
Figure 4D:
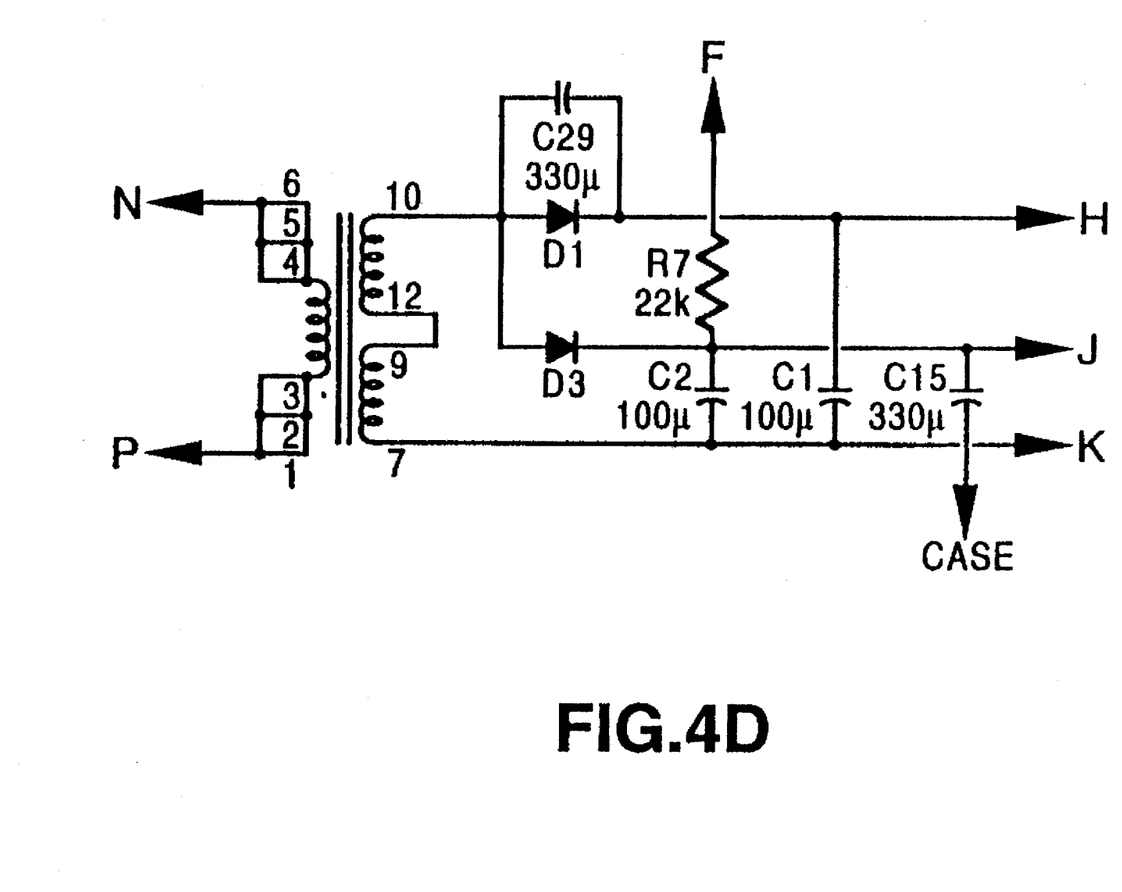

In an alternative embodiment shown in FIG. 3 and in more detail in FIGS. 4A–4D, the logic circuit 32 (FIG. 2) may comprise dedicated digital integrated circuits 36. In this circuit, the clock pulses are generated by a conventional 555 timer 80. A decade counter 82 staggers the clock pulses. Quad-input NOR gates $84_a$–$84_d$ group sequential staggered pulses into the high-low signals shown in FIG. 3, which, as can be appreciated, are four pulses in duration.

The quad-input NOR gates $84_a$–$84_d$ signals are individually connected to one of the inputs of the AND gates $86_a$–$86_d$. As can be appreciated, the AND gates $86_a$–$86_d$ pass the clock pulses when enabled by the four-pulse-duration signals from the NOR gates. Consequently, each packet that is delivered to a strobe light contains four pulses. Of course, two-input, three-input, five-input and so on NOR gates may be used instead of four-input NOR gates depending on how many pulses are desired for each packet.

As can be appreciated, depending on which sequential outputs from the decade counter 82 are connected to the NOR gates, the pulses may overlap or not overlap. For example as shown in FIG. 3, if $Q_0$–$Q_3$ and $Q_5$–$Q_8$ are the only signals ultimately used to drive the strobes, there will not be any overlap. However, if $Q_2$–$Q_5$ are used in combination with $Q_4$–$Q_7$, there will be an overlap of pulses. Accordingly, switches 88–89 (FIG. 4A) may be employed to determine the flash pattern by selecting which of the gated pulses trigger the light sources 24–27.

As can be seen from the foregoing detailed description, there is provided a lighting system and method that reduces or substantially eliminates the amount of dark time between strobe flashes, thereby improving the effectiveness of an emergency lighting system. The lighting system enables the strobe to be flashed at increased flash rates without a corresponding reduction in light intensity. Moreover, the method and system as characterized above is relatively simple to implement with existing emergency lights including strobe lights.

What is claimed is:

1. An emergency signalling system comprising: two or more light sources emitting light; a modulator coupled to the light sources for modulating the light from each of the sources between relatively low and high states of brightness to create a visual pattern from each of the light sources of cyclically flashing light, a controller connected to the modulator for controlling transitions of the light from one of the states to the other, and the controller including means for synchronizing the flashing lights from the two or more light sources such that the transition of brightness from the high to the low state in one of the light sources appears to visually overlap the transition of brightness from the low to the high state in another of the two or more light sources.

2. The system of claim 1 wherein the modulator modulates the lights such that the high state of brightness comprises an energized state and the low state of brightness comprises a de-energized state.

3. The system of claim 2 wherein the light sources are strobe tubes, and the modulator includes means for applying a pulse packet to the light source for selective energization thereof according to signals from the controller.

4. The system of claim 1 wherein the controller includes a microprocessor.

5. The system of claim 1 wherein the controller includes a memory having information stored therein representing at least one illumination pattern.

6. The system of claim 1 wherein the modulator modulates the lights such that the high state of brightness corresponds to a first output color and the low state of brightness corresponds to a second output color.

7. The system of claim 1 wherein the modulator modulates the lights such that the high state of brightness corresponds to a first intensity level and the low state of brightness corresponds to a second intensity level.

8. The system of claim 1 wherein the modulator modulates the lights such that the high state of brightness corresponds to a first color at a first intensity and the low state of brightness corresponds to a second color at a second intensity.

9. An emergency signalling system comprising: two or more light sources for radiating light in response to application of power from a source of power, a switching network between the two or more light sources and the source of power for selectively energizing the light sources to generate flashes of light from each of the sources, and a controller for controlling the selective energization of the two light sources such that an ending of a flash from a first of the light sources appears to visually overlap the beginning of a flash from a second of the light sources.

10. The system of claim 9 wherein at least one of the light sources comprises a strobe tube, and further comprising driving circuitry connected to the controller for applying pulse packets to the strobe tube according to signals from the controller for selective energization thereof.

11. A method of generating emergency signals, comprising the steps of:

broadcasting light from at least first and second light sources;

modulating each of the first and second light sources to broadcast light therefrom in a periodic visual pattern that transitions between at least relatively low and high states of brightness; and synchronizing the periodic visual pattern of the first and second light sources so that each transition of brightness of the light sources occurs between two sequential transitions of the light from the other light source.

12. The method of claim 11 wherein the step of synchronizing the modulation of the first and second light sources provides a periodic pattern in which the first light source is modulated from the second state of brightness to the first state of brightness before the light of the second light source is modulated to the second state of brightness.

13. The method of claim 11 wherein the step of modulating the first and second light sources between the first and second states of brightness comprises the steps of energizing and de-energizing each of the light sources.

14. The method of claim 13 wherein the step of energizing the light sources comprises the steps of generating pulse packets of driving signals, and applying the pulse packets to the light sources.

15. The method of claim 11 wherein the step of modulating the first light source between a first and a second state of brightness comprises the step of adjusting the output intensity of a continuous light.

16. The method of claim 15 wherein the duration of the first state of brightness for at least one of the light sources is substantially equal to the duration of the second state of brightness whereby the modulation between states has approximately a fifty percent duty cycle.

17. The method of claim 11 wherein the step of modulating the first light source between first and second states of brightness comprises the step of adjusting the output color to provide light at first and second output colors.

18. The method of claim 11 wherein the step of modulating the first and second light sources comprises the step of accessing a memory to obtain information for adjusting the states of brightness thereof.

19. A method of increasing the effectiveness of an emergency lighting system, comprising the steps of energizing and de-energizing first and second lamps to broadcast light therefrom in a fashion of alternating flashes, and synchronizing the alternating flashes of the first and second lamps to visually overlap such that the second lamp is energized before the first lamp is de-energized and the first and second light sources are de-energized at different times.

* * * * *